(12) United States Patent
Sathyanarayana et al.

(10) Patent No.: US 12,393,475 B2
(45) Date of Patent: Aug. 19, 2025

(54) INTELLIGENT TELEMETRY MONITORING AND STREAMING FOR DATACENTERS

(71) Applicant: MICROSOFT TECHNOLOGY LICENSING, LLC, Redmond, WA (US)

(72) Inventors: Kiran Bangalore Sathyanarayana, Bengaluru (IN); Shameer Pulikkal, Bengaluru (IN); Hemanth Achanta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 18/136,267

(22) Filed: Apr. 18, 2023

(65) Prior Publication Data
US 2024/0354181 A1 Oct. 24, 2024

(51) Int. Cl.
*G06F 11/00* (2006.01)
(52) U.S. Cl.
CPC ........ *G06F 11/004* (2013.01); *G06F 2201/88* (2013.01)
(58) Field of Classification Search
CPC . G06F 11/004; G06F 11/3409; G06F 11/3006
See application file for complete search history.

(56) References Cited

U.S. PATENT DOCUMENTS

| | | | | |
|---|---|---|---|---|
| 10,721,135 | B1* | 7/2020 | Delson | ............... H04L 67/52 |
| 11,477,288 | B1* | 10/2022 | Singh | ............... H04L 67/12 |
| 2020/0136943 | A1 | 4/2020 | Banyai | |
| 2022/0269577 | A1* | 8/2022 | Gechman | ............ G06F 11/3006 |

OTHER PUBLICATIONS

International Search Report and Written Opinion received for PCT Application No. PCT/US2024/023514, Sep. 6, 2024, 16 pages.

* cited by examiner

*Primary Examiner* — Amine Riad
(74) *Attorney, Agent, or Firm* — Han Gim; Newport IP, LLC

(57) ABSTRACT

A system receives, from a policy command service executing in a control plane of a distributed computing system, a configuration file defining parameters to be monitored at the computing node, a timing factor indicating when the parameters are to be monitored, and a threshold for when the parameters are to be sent from the computing node. Based on the configuration file, while the computing node is operational in the distributed computing system, the baseboard management controller is configured to monitor the computing node in accordance with the configuration file. The baseboard management controller sends, to a storage at the distributed computing system, the parameters defined in the configuration file for analysis of maintenance and health of the computing node.

19 Claims, 6 Drawing Sheets

INTELLIGENT TELEMETRY MONITORING AND STREAMING FOR DATACENTERS

BACKGROUND

Data centers can have thousands or millions of nodes such as servers that provide various cloud-based services. The servers collectively need to operate reliably in order to provide high-performance cloud-based services. It is therefore important to provide an effective monitoring mechanism to detect anomalies early, take corrective action, and track each node over its lifecycle to maintain node health and avoid downtime, which otherwise can lead to revenue loss and customer dissatisfaction.

To maintain node health and serviceability, telemetry plays a significant role in enabling and collecting health parameters. With the scale and size of today's data centers, existing static telemetry mechanisms are inadequate and inefficient. When the monitoring of telemetry parameters is static, any change required to monitor a new telemetry parameter requires a firmware change which is a costly operation in a data center and one that makes the telemetry mechanisms less adaptive.

In a cloud-based system (e.g., one or more data centers) that includes thousands or millions of nodes, the inability to maintain node health and serviceability can have consequences such as processing delays, increased costs, frustrated customers, etc.

SUMMARY

Present day telemetry systems typically monitor and store all available parameters from each of the servers in a data center. Furthermore, monitoring of telemetry parameters is static and cannot be adapted to the conditions at the data center—i.e., there is no closed loop mechanism to adapt to changing conditions at the data center. Each data center typically requires different telemetry parameters to be monitored and stored based on environmental and other conditions as well as the workloads at each node in the data center. As used herein, a node is also referred to as a computing node, and can include a computing device such as a server. The prediction methods that need to be applied for each telemetry parameter can also vary.

Additionally, existing solutions consume a large amount of storage space as existing solutions tend to collect parameters that are not needed. Existing mechanisms may work for low scale data centers. However, in today's large scale data centers, static mechanisms can result in excessive monitoring and storage of data, resulting in inefficient and counterproductive processes for analyzing maintenance issues. This is especially true when the majority of a node's parameter values are within normal operating range for most of the node's lifecycle.

The techniques disclosed herein implement a smart telemetry monitoring and streaming (STMS) system that improves upon today's static telemetry systems with reduced storage and network bandwidth consumption and with a more efficient and flexible approach that improves overall resource utilization, overhead cost, and serviceability. One of the ways that STMS provides these benefits is by granular control of the telemetry data that is sent out of each node.

In an embodiment, each node at a data center includes a baseboard management controller (BMC) that is configured with functionality to support the health monitoring and operation of a server. The BMC performs telemetry parameter monitoring and streams the values for storage according to a desired configuration in order to aid in debugging and monitoring of the nodes in the data center.

In an embodiment, a policy command service (PCS) is implemented in the control plane fabric of the data center. The PCS is used to generate and push configuration files onto each node's BMC. The configuration files sent by the PCS include the list of parameters of interest for each node.

This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for monitoring a distributed computing system comprising a plurality of nodes. Various examples, scenarios, and aspects are described below with reference to FIGS. 1-6.

Figure 1:
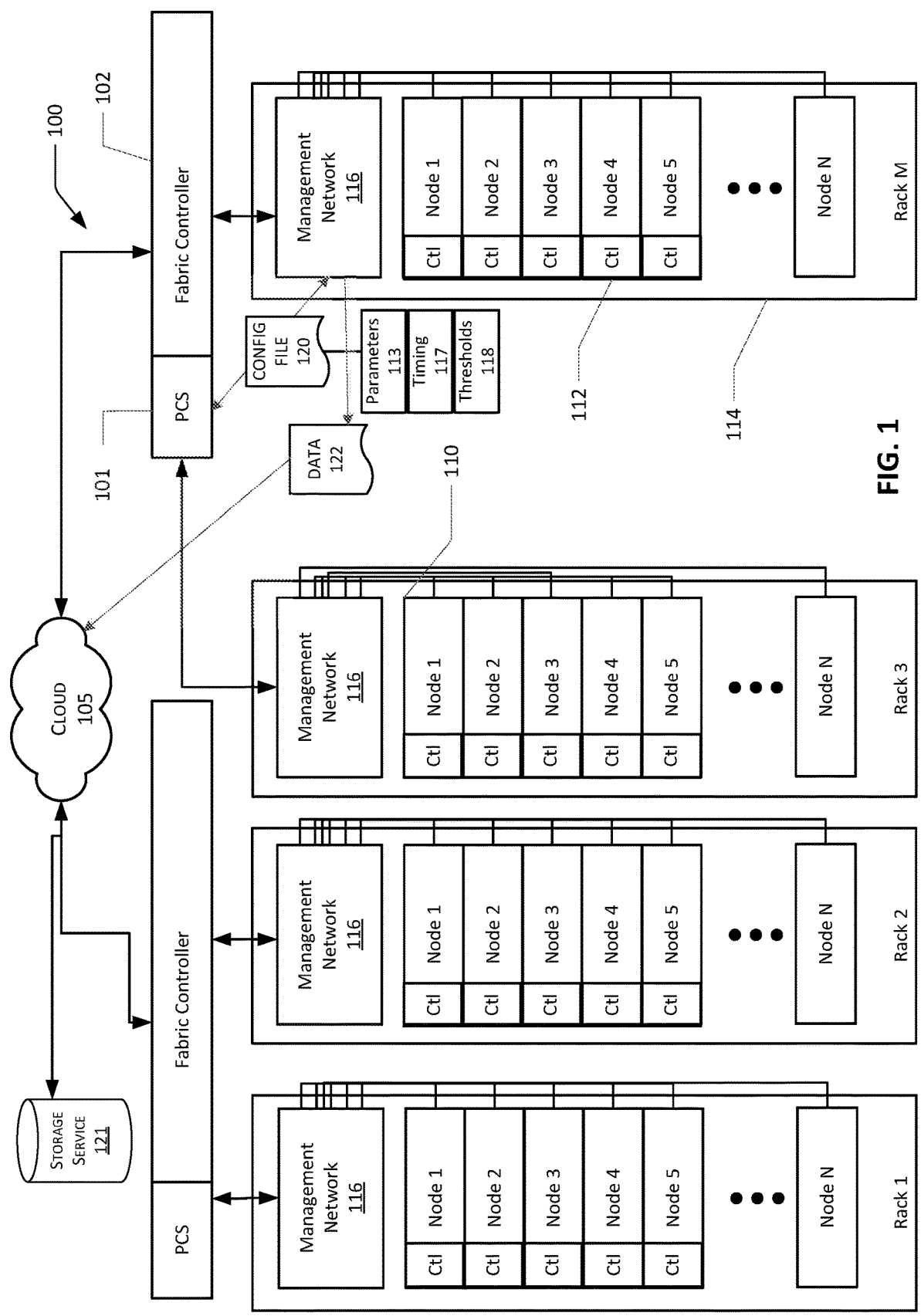
FIG. 1 illustrates an example environment in which a computing node (e.g., a server) is configured to receive a configuration file for monitoring parameters.

Referring to FIG. 1, illustrated is a cloud service with a data center 100 and a PCS service 101 that is capable of communicating with nodes 110 in the data center 100. In an embodiment, the PCS service 101 runs on a fabric controller 102 in a control plane of the data center 100 and communicates with nodes 110 using a network connection that is available on a controller 112 of each node 110. The PCS service 101 has a distributed service architecture implemented at the cloud infrastructure and communicates with nodes 110 and clusters (not shown) in the data center as shown in FIG. 1. In an embodiment, and as further described below, the controller 112 can be a baseboard management controller (BMC). The nodes can be servers that are arranged in racks 114.

FIG. 1 illustrates one example of how a node connection architecture can be arranged in data center 100. Data center 100 contains physical racks 114 which consist of multiple nodes 110 (e.g., servers) racked/placed per rack 114. Each rack 114 has an individual power supply that provides power supply to the nodes 110 and a management network infrastructure 116 for each rack 114. The management network infrastructure 116 in FIG. 1 represents a network infrastructure for the data center 100 and can include network switches, VLAN and network topologies, etc. according to data center requirements.

The fabric controller 102 is part of the management/control plane in data center 100. In an embodiment, the fabric controller 102 comprises a pool of physical servers which hosts multiple management services that manage allocated server racks. A data center supervisor/operator can log in to the fabric controller 102 and perform status checks and initiate action on the individual nodes 110 as needed. The fabric controller 102 communicates to the controllers 112 of various nodes 110 over a network connection provided by the controllers 112. The fabric controller 102 can check current monitoring parameters, error logs, and events from each node 110 by requesting the data from the controllers 112. The fabric controller 102 can send a new payload to the controllers 112 which can be configuration files 120, firmware update payloads, etc.

In an embodiment, the PCS service 101 is hosted on the fabric controller 102 as shown FIG. 1. In an example, an operator logs into a fabric controller 102 and configures the required configuration files 120 that are to be pushed to each node 110 in the data center 100. In an embodiment, the PCS service 101 is hosted locally inside data center 100 on each of the fabric controllers 102 to avoid network latency, deployment latency, etc. and to enable real time configuration changes when possible. If configuration files 120 need to be pushed remotely from a global cloud service via cloud 105 to the individual nodes 110 in the data center 100, this may include multiple transmission hops, monitoring of the deployment of the configuration files 120, monitoring of possible deployment aborts, etc. which need to be monitored with varying cadence and processes. By pushing such functions locally onto the fabric controllers 102, the complexity of the deployment can be reduced and failed deployments can be avoided.

The PCS service 101 also sends information about the current configuration file 120 for each node to the cloud service provider via cloud 105 for storage on databases such as storage service 121 which can be viewed remotely by any operator. The PCS service 101 also sends audit logs containing the time when configuration files 120 were pushed, the owner or operator who entered the configuration files 120, any aborts of the configuration file push, etc. to the cloud service provider for auditing and monitoring purposes.

Figure 2:
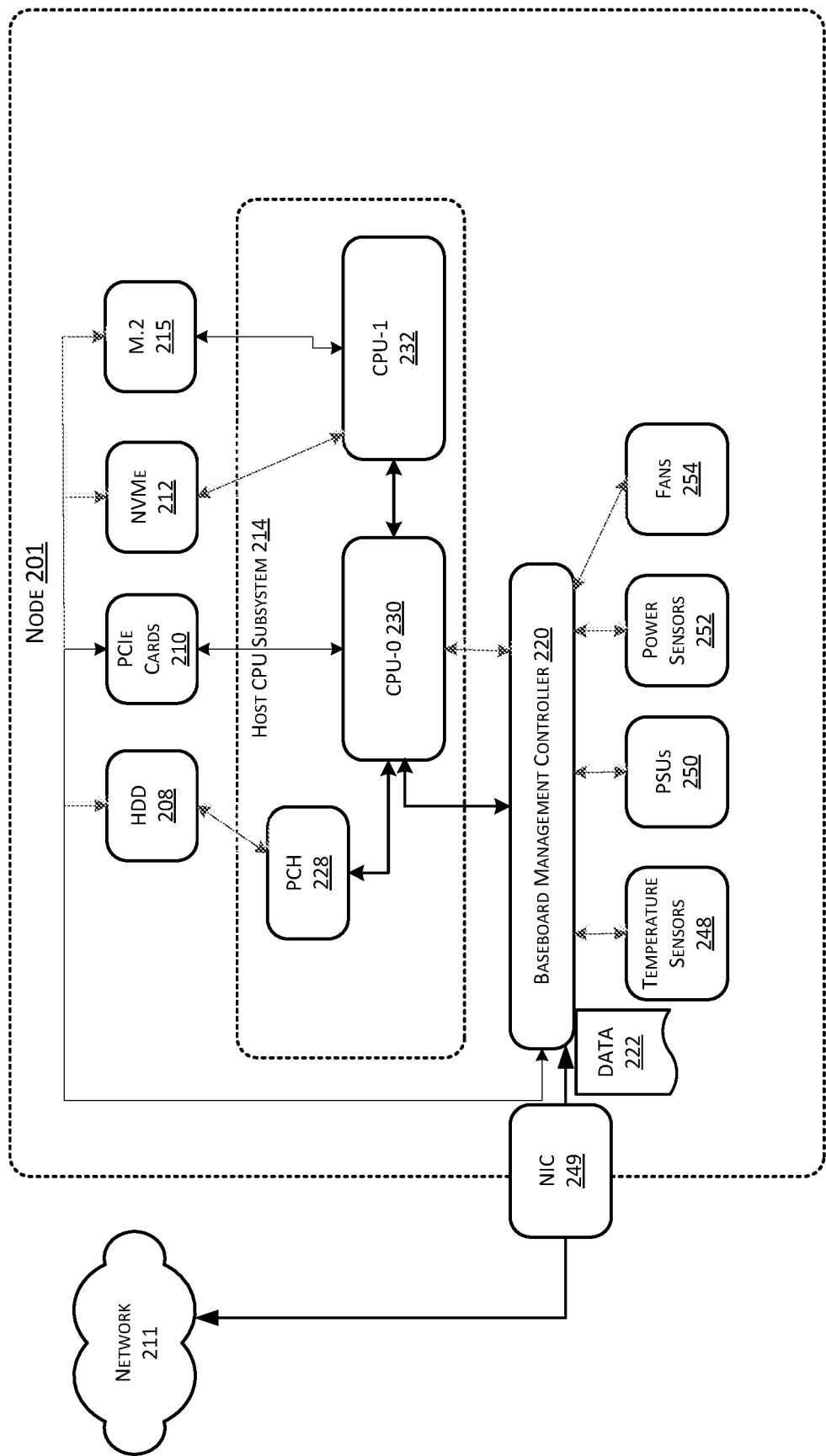
FIG. 2 illustrates further detail of a node in FIG. 1.

FIG. 2 illustrates an example environment which depicts an example node 201, which can be a server (e.g., Intel 2 CPU Server). As shown in FIG. 2, the BMC 220 is the main monitoring controller on the node 201 which is connected to various sensors and other devices on the node 201. Node 201 includes a CPU subsystem 214 with CPU-0 230 and CPU-1 232, as well as platform controller hub (PCH) 228 which acts as a central interface between the CPU-0 230 and CPU-1 232, memory, and I/O devices on a motherboard of node 201. Memory devices can include hard disk drive (HDD) 208 and M.2 SSDs 215. I/O devices can include Peripheral Component Interconnect Express (PCIe) card 210 and Non-Volatile Memory Express (NVMe) 212.

In an embodiment, the BMC 220 is a service processor that is capable of monitoring the physical state of the node memory, other hardware components, and/or peripheral devices using sensors and/or other mechanisms. The BMC 220 is configured on the main circuit board of a computing device (e.g., a server) such as node 201 and can implement remote communications via a shared or a dedicated network interface card (NIC) 249. In one example the BMC 220 is configured to perform tasks that otherwise would need to be performed by a user physically visiting the node in a server rack. For example, considering a cloud platform (e.g., AMAZON WEB SERVICES, GOOGLE CLOUD PLATFORM, MICROSOFT AZURE) with a large number of network servers executing cloud tenant workloads via a data plane, the BMC 220 is part of a manageability subsystem that forms part of a control plane in the cloud platform. The control plane can be used to collect telemetry data across the network servers for administrative or operational purposes. Consequently, the BMC 220 is configured to harvest and report the telemetry data for the network servers configured within data center(s) of a cloud platform.

Data 222 from the temperature sensors 248, power sensors 252, fans 254, PSUs 250, etc. are collected by the BMC 220. The collected data 222 is monitored for threshold crossing events and raising events and system event logs (SELs) when any sensor crosses a configured threshold such as thresholds 118 in FIG. 1. In an embodiment, the sensor monitoring and SEL logging functionality can be in accordance with industry specific Intelligent Platform Management Interface (IPMI) specifications.

The BMC 220 is connected to external networks through NIC 249 as shown in FIG. 2. An external client can download a file or submit a request for sensor data, SEL logs, etc. through NIC 249. In an embodiment, a communication mechanism is implemented using a secured Hypertext Transfer Protocol Secure (HTTPS) channel between the external client and the BMC 220.

The various components and functions illustrated in FIGS. 1 and 2 provide functionality for a smart telemetry monitoring and streaming (STMS) system. In an embodiment, a method is implemented for monitoring a distributed computing system comprising a plurality of nodes, such as data center 100 in FIG. 1. In an example, the nodes 110 of FIG. 1 can be servers communicatively coupled to controllers 112 configured to monitor local conditions at the nodes 112. The policy command service 101 executes in a control plane of the data center 100. The policy command service 101 generates configuration file 120 defining parameters 113 to be monitored at a selected node of the distributed computing system, a timing factor 117 indicating when the parameters are to be monitored, and a threshold 118 for when the parameters 113 are to be sent from the node 110.

The configuration file 120 is sent to controller 112 communicatively coupled to a selected node 112. The configuration file 120 is usable to configure the controller 112 that is communicatively coupled to the selected node 112 to monitor the selected node 110 in accordance with the configuration file 120. The controller 112 is configured while the selected node 110 is operational in the data center 100. The parameters 113 defined in the configuration file 120 are received as data 122 from the controller 112. In an embodiment, the data 122 is received by additional devices in the network such as a rack manager (not shown). In other embodiments, the data 122 can be received by other components shown in FIG. 1. The received parameters 113 are stored at storage service 121 for analysis of maintenance and health of the selected node 110.

Figure 3:
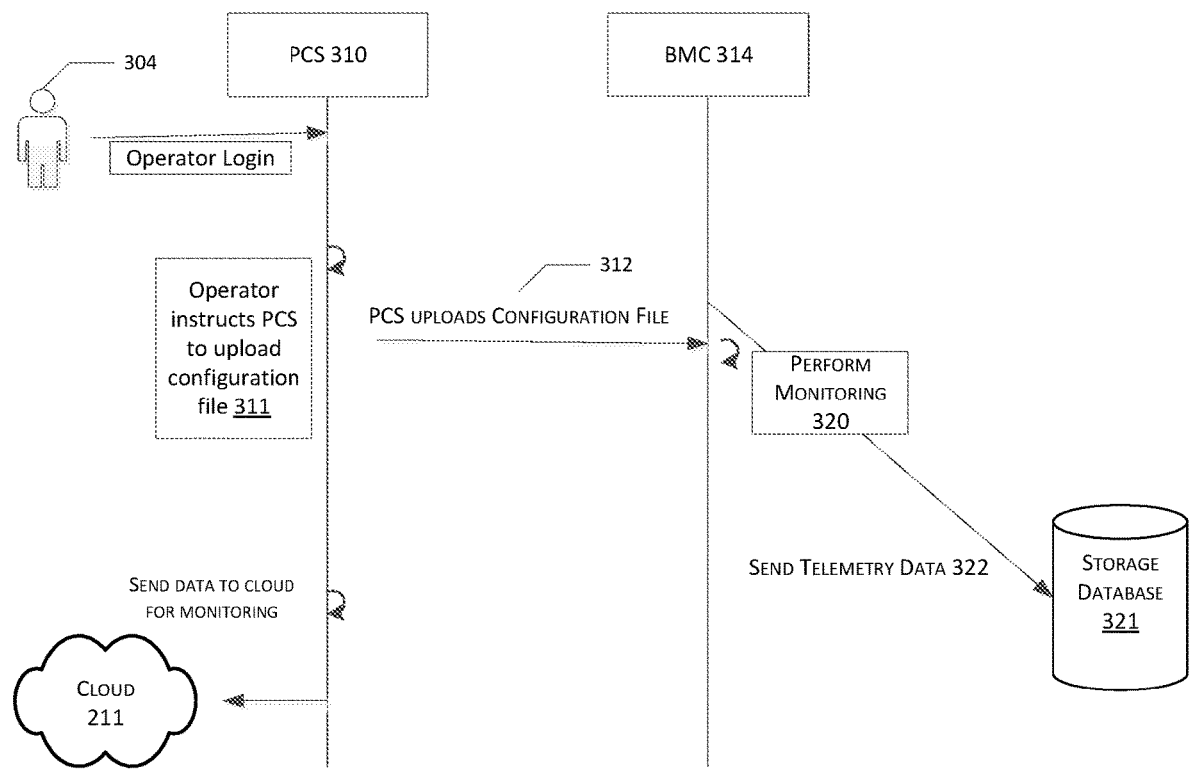
FIG. 3 illustrates an example workflow diagram for monitoring a system.

Referring to FIG. 3, illustrated is an example workflow for managing nodes in a data center in accordance with the disclosure. The PCS service 310 pushes the configuration file 312 for each node present in the data center. The configuration file for each node can be determined by a data center operator 304 who instructs the PCS 310 to upload 311 the configuration file. In some embodiments, the configuration file for each node can be determined by an artificial intelligence (AI)/machine learning (ML) algorithm that uses attributes such as server location, ambient temperature, datetime value (seasonal changes) or parameters such as CPU temperature, fan speed, server workloads, etc. Trigger conditions can be specified in the configuration file for each of the attributes.

By implementing the disclosed embodiments, the telemetry monitoring and streaming process using a BMC 314 is not static and will read the configuration file and adjust the monitoring algorithms according to the configuration file. The BMC 314 will perform monitoring 320 of parameters in accordance with the configuration file. If the trigger conditions described in the configuration file are met, the BMC 314 will send out, from the node, the telemetry parameters 322 identified in the configuration file. This allows for reduction of the telemetry data to only information that has been identified as being desired for monitoring. The telemetry data can be stored in a storage database 321 for analysis. This approach optimizes the data being sent out of the node as well as the timing of the data. PCS 310 also sends the current configuration file, audit log, and other information for each server node to the cloud via network 211 for auditing and monitoring.

The configuration file can be a preset template or a custom configuration file defined by the data center operator or other means. In an embodiment, the configuration file can be a JavaScript Object Notation (JSON) file. The custom configuration file can also be determined through AI/ML algorithms at runtime that is running at the data center.

An example configuration file for monitoring a server subsystem can be used for monitoring server system related parameters with a monitoring frequency (e.g., 60 seconds). The example server subsystem monitoring configuration file can include:

Trigger conditions defined based on system sensors—e.g., CPU temperature, CPU power, dual in-line memory module (DIMM) temperature, graphics processing unit (GPU) Power, NIC power, server workload parameters, etc.

Trigger thresholds such as the rate of change of the sensor values or a direct comparison with a predetermined value.

Based on the configuration file for monitoring the server subsystem, the BMC takes a snapshot of all system-related sensor values when the trigger conditions are met and streams the data for storage.

As another example, a balanced monitoring policy file can be used for monitoring only CPU related parameters as well as selected hardware sensors with a preset monitoring frequency (e.g., 3 minutes). The example balanced monitoring policy file can include:

Trigger conditions defined based on system sensors—e.g., CPU temperature, CPU power, voltage regulator (VR) temperature.

Trigger thresholds such as the rate of change of the sensor values or a direct comparison with a predetermined value.

Based on the balanced monitoring policy file, the BMC takes a snapshot of all system-related sensor values when the trigger conditions are met and streams the data for storage.

An example aggressive monitoring policy file can be used for aggressive monitoring policies which will monitor all temperature sensors, voltage sensors, firmware status, hardware interface links, etc. with a preset monitoring frequency (e.g., 30 seconds).

Trigger conditions defined based on system sensors such as CPU temperature and power, VR temperature, DIMM sensors, GPU power and temperature, BMC firmware status, Basic Input/Output System (BIOS) system management interrupts (SMI) status/rate, PCIe link status, GPU error-correcting code (ECC) status, field programmable gate array (FPGA) firmware status, etc.

Trigger thresholds such as the rate of change of the sensor values or a direct comparison with a predetermined value The BMC takes a snapshot of all monitored sensor values, the BMC CPU and memory consumption, and file handler descriptor count when the trigger conditions are met and streams the data for storage.

A custom configuration file can be used for setting custom configuration definitions by the data center operator or can be generated through AI/ML algorithms from a cloud service running at the data center. The frequency, trigger conditions, and monitoring rules are defined in the custom configuration file. The BMC will read the configuration file and monitor and stream the data according to the defined trigger conditions.

Figure 4:
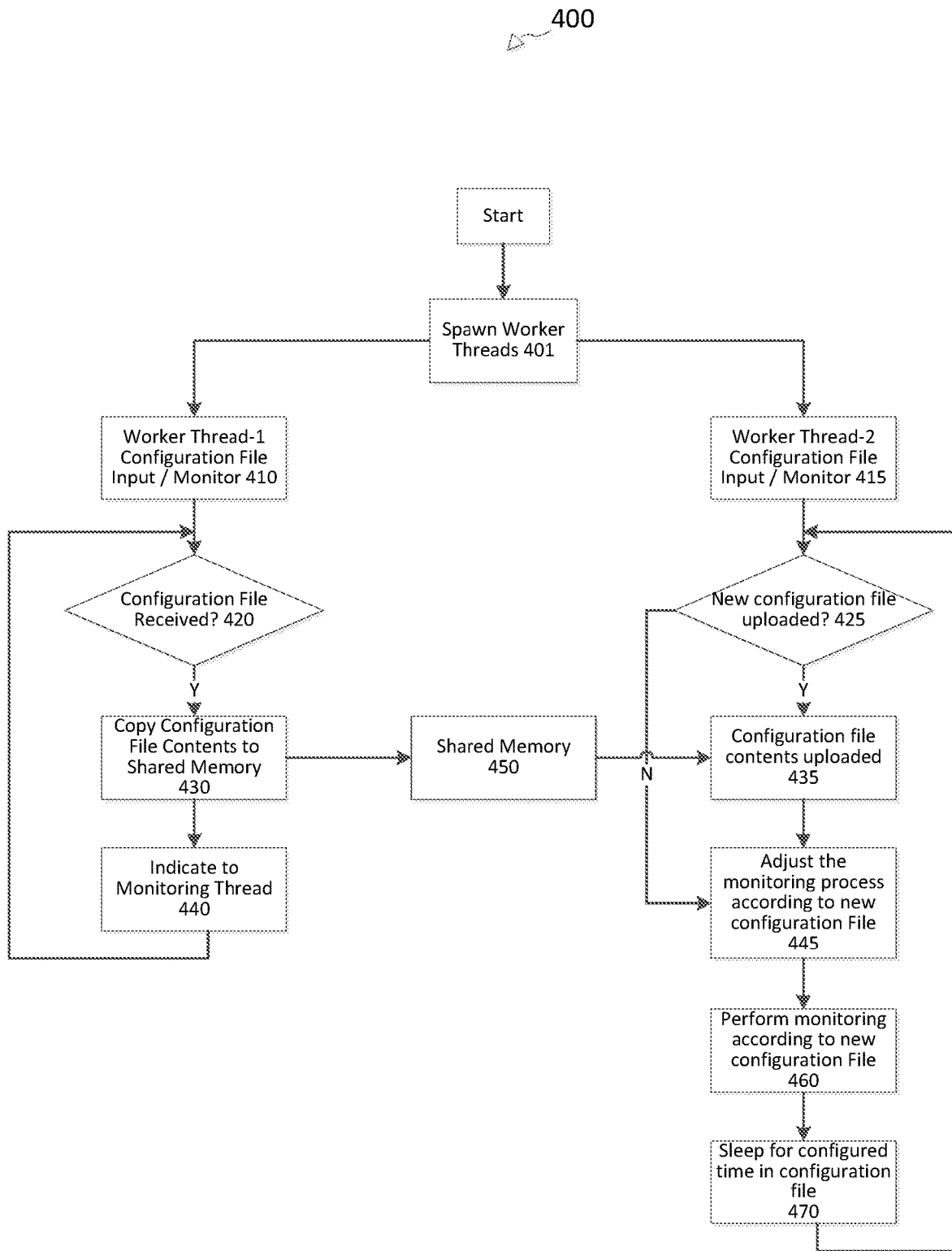
FIG. 4 illustrates an example flow diagram of an example method for monitoring a system.

Referring to FIG. 4, illustrated is a functional flow chart 400 for configuring a BMC to monitor parameters in accordance with the disclosure. In an embodiment, a monitoring application is implemented in the BMC. The monitoring application is started on boot-up of the associated node or server. The monitoring application internally spawns worker threads 401 to perform configuration file input checks and monitor functionality according to the received configuration file for worker thread-1 410 and worker thread-2 415. The worker threads work in synchronization to share the received configuration file through inter-process communication (IPC). The monitoring thread is operable to change the monitoring processes according to the received configuration file and is therefore not statically configured.

For worker thread-1, if a configuration file is received 420, then the contents of the configuration file are copied 430 to shared memory 450. An indication is provided to the monitoring thread 440, and operation continues at operation 420. For worker thread-2, if a new configuration file is received 425, then the contents of the configuration file are read and uploaded 435. The monitoring process is adjusted according to the new configuration file 445. Monitoring is then performed according to the new configuration file 460. The worker thread-2 then sleeps 470 or otherwise waits for a time period as defined in the configuration file.

In some embodiments, the PCS service reads the current parameters from the node and generates a configuration file using an AI/ML model. The AI/ML model can be trained using monitored data and predicted and actual system faults. The generated configuration file can be uploaded to the BMC to perform the desired monitoring. The AI/ML model can be configured to receive and analyze past faults and monitored data that occurred over a predetermined period of time. The AI/ML model is configured to predict, as an output, a failure of a node. A maintenance action can be initiated in response to a predicted failure.

The AI/ML model can be any one of various predictive models. For instance, the AI/ML model can use any one of neural networks (e.g., convolutional neural networks, recurrent neural networks such as Long Short-Term Transformer, etc.), Naïve Bayes, k-nearest neighbor algorithm, majority classifier, support vector machines, random forests, Classification and Regression Trees (CART), gradient-boosted decision trees (GBDTs), and so on.

Technical benefits of the disclosed embodiments include configurability, flexibility and control of health monitoring of nodes in a data center. Currently, the telemetry data points are statically configured and embedded in the firmware image of the nodes, which in turn determines what data is sent out from a node and at what rate/frequency. This inflexible design leads to high network bandwidth consumption and frequent firmware updates and deployment in the field, which leads to inefficiencies and waste. With implementation of the disclosed embodiments, the required parameters are dynamically configurable, as well as the data rates streamed from the device to storage. This approach provides improved flexibility and configurability, enabling system resources to be utilized more efficiently.

Technical benefits of the disclosed embodiments also include reduction of the storage requirements for monitored data. Currently, telemetry data are provided from millions of nodes without any filtration mechanism, leading to vast amounts of storage consumption. Typically, most of the stored telemetry data is unused in any debugging scenario, leading to wasted resources and cost. The disclosed embodiments enable streaming of only relevant data that is provided at the desired times. This allows storage requirements to be significantly reduced, lowering the overall cost of maintenance.

Additionally, since only the data that is important for debugging and serviceability are streamed out of the nodes, a smaller and more relevant data set is provided for analysis. This allows more efficient analysis and prediction of faults, which in turn allows for corrective measures to be determined efficiently and for the corrective measures to be taken prior to an actual fault and thus avoid costly downtime.

Technical benefits of the disclosed embodiments also include avoidance of firmware qualification, BMC downtime, and firmware deployment efforts at the data center. The disclosed embodiments allow for monitored parameters, monitoring rules, and associated trigger conditions to be dynamically configurable. Accordingly, firmware changes are not required to introduce new monitoring conditions, such as for a new sensor or for changing the rules or trigger conditions for existing monitored sensors.

Figure 5:
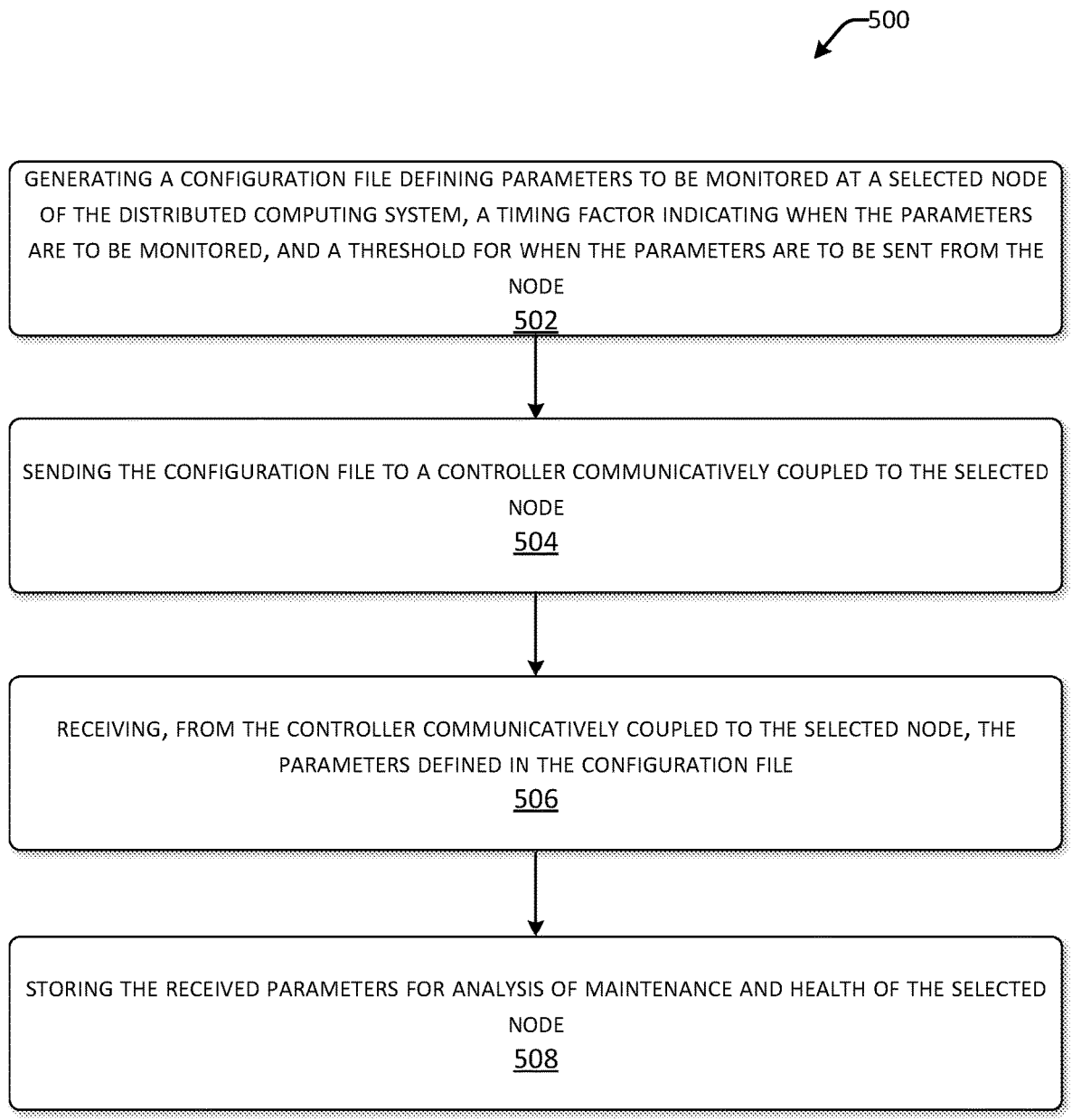
FIG. 5 illustrates an example flow diagram of an example method for monitoring a system.

FIG. 5 represents an example process implemented in accordance with various examples from the description of FIGS. 1-4. The example operations shown in FIG. 4 can be implemented on or otherwise embodied in one or more components shown in FIGS. 1-4.

The order in which the operations are described is not intended to be construed as a limitation, and any number of the described operations can be combined in any order and/or in parallel to implement each process. Moreover, the operations in FIG. 5 can be implemented in hardware, software, and/or a combination thereof. In the context of software, the operations represent computer-executable instructions that, when executed by one or more processing units, cause the one or more processing units to perform the recited operations. For example, modules and other components described herein can be stored in a computer-readable storage media and executed by at least one processing unit to perform the described operations.

FIG. 5 illustrates a flow diagram of an example method 500 for monitoring a distributed computing system comprising a plurality of nodes, where the nodes communicatively coupled to controllers configured to monitor local conditions at the nodes. The operations in FIG. 5 can be implemented by data center 100.

At operation 502, a policy command service executing in a control plane of the distributed computing system generates a configuration file defining parameters to be monitored at a selected node of the distributed computing system, a timing factor indicating when the parameters are to be monitored, and a threshold for when the parameters are to be sent from the node;

At operation 504, the configuration file is sent to a controller communicatively coupled to the selected node. The configuration file is usable to configure the controller communicatively coupled to the selected node to monitor the selected node in accordance with the configuration file. The controller communicatively coupled to the selected node is configured while the selected node is operational in the distributed computing system.

At operation 506, the parameters defined in the configuration file are received from the controller communicatively coupled to the selected node.

At operation 508 the received parameters are stored for analysis of maintenance and health of the selected node.

Figure 6:
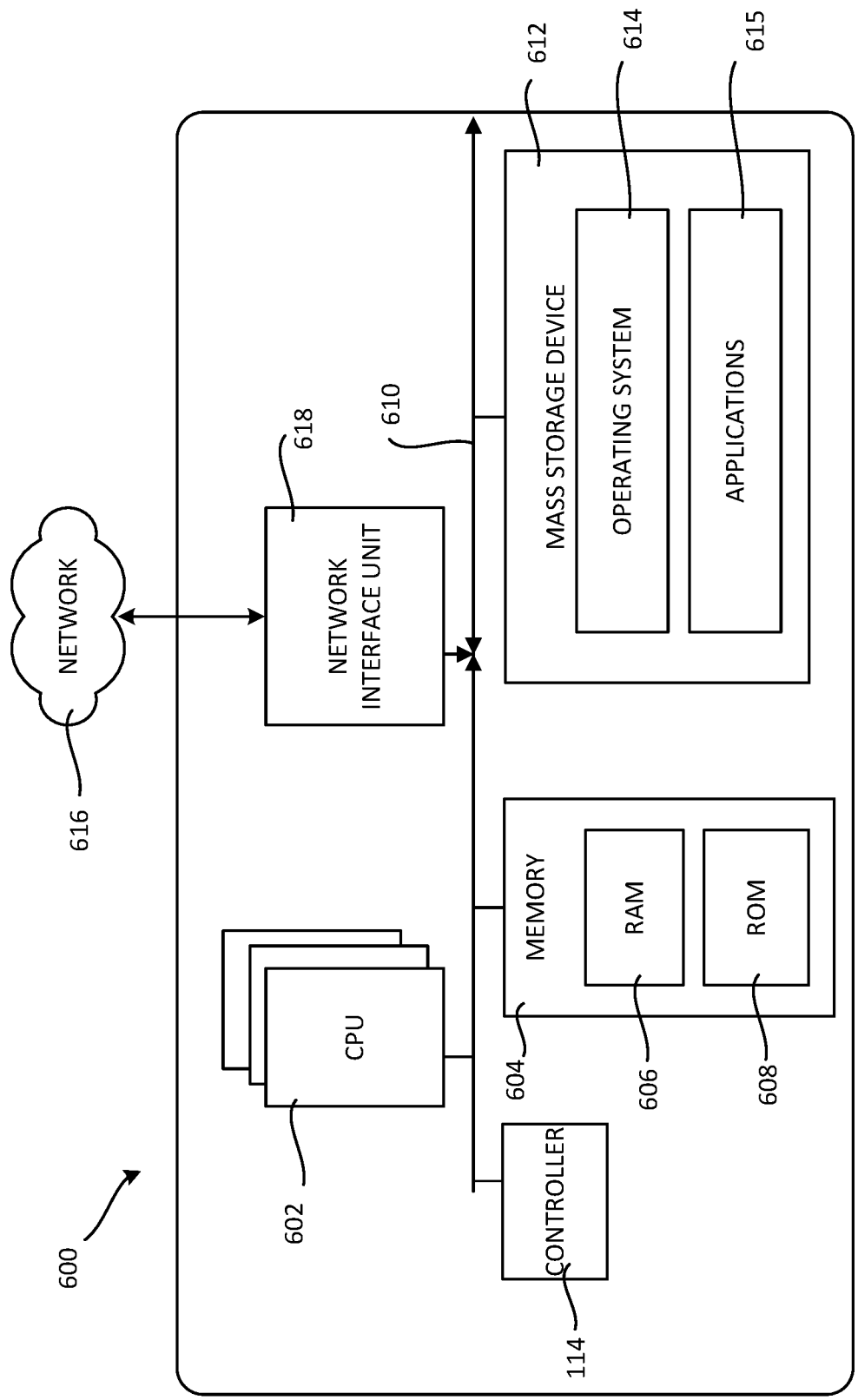
FIG. 6 is an example computer architecture diagram illustrating an illustrative computer hardware and software architecture for a computing system capable of implementing aspects of the techniques and technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement the node 110 in FIG. 1.

The computing device 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computing device 600, such as during startup, can be stored in the ROM 608. The computing device 600 further includes a mass storage device 612 for storing an operating system 614, applications 615, and/or other types of programs.

The mass storage device 612 is connected to the CPU 602 through a mass storage controller connected to the bus 610. The mass storage device 612 and its associated computer readable media provide non-volatile storage for the computing device 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," and variations thereof, does not include waves or signals per se or communication media.

According to various configurations, the computing device 600 can operate in a networked environment using logical connections to remote computers through a network such as the network 616. The computing device 600 can connect to the network 616 through a network interface unit 618 connected to the bus 610. It should be appreciated that the network interface unit 618 can also be utilized to connect to other types of networks and remote computer systems.

It should be appreciated that the software components described herein, when loaded into the CPU 602 and executed, can transform the CPU 602 and the overall computing device 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602. FIG. 6 further illustrates that the controller 112 is also connected to the bus 610.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different types, two different requests, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

The disclosure presented herein also encompasses the subject matter set forth in the following clauses.

Example Clause A, a method for monitoring a distributed computing system comprising a plurality of nodes, the nodes communicatively coupled to controllers configured to monitor local conditions at the nodes, the method comprising: generating, by a policy command service executing in a control plane of the distributed computing system, a configuration file defining parameters to be monitored at a selected node of the distributed computing system, a timing factor indicating when the parameters are to be monitored, and a threshold for when the parameters are to be sent from the node; sending the configuration file to a controller communicatively coupled to the selected node, wherein the configuration file is usable to configure the controller communicatively coupled to the selected node to monitor the selected node in accordance with the configuration file, wherein the controller communicatively coupled to the selected node is configured while the selected node is operational in the distributed computing system; receiving, from the controller communicatively coupled to the selected node, the parameters defined in the configuration file; and storing the received parameters for analysis of maintenance and health of the selected node.

Example Clause B, the peripheral device cartridge of Example Clause A, wherein the policy command service runs in a fabric controller in the distributed computing system.

Example Clause C, the peripheral device cartridge of Example Clause A, wherein the configuration file is generated based on inputs provided by a machine learning model.

Example Clause D, the peripheral device cartridge of any one of Example Clause A through Example Clause C, wherein the threshold for when the parameters are to be sent from the node comprise trigger conditions for a sensor on the node.

Example Clause E, the peripheral device cartridge of any one of Example Clause A through Example Clause D, wherein the trigger conditions comprise a rate of change of sensor outputs or a comparison with a predetermined value.

Example Clause F, the peripheral device cartridge of any one of Example Clause A through Example Clause E, wherein the controller comprises a baseboard management controller.

Example Clause G, the peripheral device cartridge of any one of Example Clause A through Example Clause F, further comprising: generating, by the policy command service, an updated configuration file defining updates to the parameters to be monitored at the selected node; and sending the updated configuration file to the controller communicatively coupled to the selected node.

Example Clause H, the peripheral device cartridge of any one of Example Clause A through Example Clause G, further comprising: analyzing the stored parameters to predict a failure of the selected node.

Example Clause I, the peripheral device cartridge of any one of Example Clause A through Example Clause H, further comprising: in response to the predicted failure, initiating a maintenance action for the selected node.

Example Clause J, a computing node comprising a baseboard management controller configured to perform operations comprising: receiving, from a policy command service executing in a control plane of a distributed computing system, a configuration file defining parameters to be monitored at the computing node, a timing factor indicating when the parameters are to be monitored, and a threshold for when the parameters are to be sent from the computing node; based on the configuration file, configuring, while the computing node is operational in the distributed computing system, the baseboard management controller to monitor the computing node in accordance with the configuration file; and sending, by the baseboard management controller to a storage at the distributed computing system, the parameters defined in the configuration file for analysis of maintenance and health of the computing node.

Example Clause K, the host computing system of Example Clause J, wherein the threshold for when the parameters are to be sent from the node comprise trigger conditions for a sensor on the node.

Example Clause L, the host computing system of Example Clause J or Example Clause K, wherein the trigger conditions comprise a rate of change of sensor outputs or a comparison with a predetermined value.

Example Clause M, the host computing system of any one of Example Clause J through Example Clause L, the baseboard management controller further configured to perform operations comprising: receiving, from the policy command service, an updated configuration file defining updates to the parameters to be monitored at the computing node; and sending the updated configuration file to the controller communicatively coupled to the computing node.

Example Clause N, the host computing system of any one of Example Clause H through Example Clause M, the baseboard management controller configured to perform operations comprising: receiving, from the policy command service, an updated configuration file defining updates to the parameters to be monitored at the computing node; and configuring, while the computing node is operational in the distributed computing system, the baseboard management controller to monitor the computing node in accordance with the updated configuration file.

Example Clause O, the host computing system of any one of Example Clause H through Example Clause N, wherein the baseboard management controller is configured to communicate directly to the distributed computing system via a network interface.

Example Clause P, the host computing system of any one of Example Clause H through Example Clause O, wherein baseboard management controller is communicatively coupled to a plurality of sensors on the computing node, and the parameters are collected by the baseboard management controller from the communicatively coupled sensors.

Example Clause Q, a baseboard management controller configured to perform operations comprising: receiving, from a policy command service executing in a control plane of a distributed computing system, a configuration file defining parameters to be monitored at a computing node communicatively coupled to the baseboard management controller, a timing factor indicating when the parameters are to be monitored, and a threshold for when the parameters are to be sent from the computing node; based on the configuration file, configuring, while the computing node is operational in the distributed computing system, the baseboard management controller to monitor the computing node in accordance with the configuration file; and sending, by the baseboard management controller to a storage at the distributed computing system, the parameters defined in the configuration file for analysis of maintenance and health of the computing node.

Example Clause R, the server device of Example Clause Q, wherein the threshold for when the parameters are to be sent from the node comprise trigger conditions for a sensor on the node.

Example Clause S, the server device of Example Clause Q or Example Clause R, wherein the trigger conditions comprise a rate of change of sensor outputs or a comparison with a predetermined value.

Example Clause T, the server device of any one of Example Clause Q through Example Clause S, wherein the operations further comprise: receiving, from the policy command service, an updated configuration file defining updates to the parameters to be monitored; and configuring, while the baseboard management controller is operational, the baseboard management controller to monitor the computing node in accordance with the updated configuration file.

What is claimed is:

1. A method for monitoring a distributed computing system comprising a plurality of server nodes, each of the server nodes communicatively coupled to a baseboard management controller configured to monitor local conditions at the server nodes, the method comprising:

generating, by a policy command service executing in a control plane of the distributed computing system, a configuration file defining parameters to be monitored at a selected server node of the distributed computing system, a timing factor indicating when the parameters are to be monitored, and a threshold for when the parameters are to be sent from the selected server node;

sending the configuration file to a baseboard management controller communicatively coupled to the selected server node, wherein the configuration file is usable to configure the baseboard management controller communicatively coupled to the selected server node to monitor the selected server node in accordance with the configuration file, wherein the baseboard management controller communicatively coupled to the selected server node is configured while the selected server node is operational in the distributed computing system and wherein the baseboard management controller is configured to: copy content of the configuration file to a shared memory, and spawn worker threads to upload content of the configuration file from the shared memory and monitor the selected server node according to the configuration file;
receiving, from the baseboard management controller communicatively coupled to the selected server node, the parameters defined in the configuration file; and
storing the received parameters for analysis of maintenance and health of the selected node.

2. The method of claim 1, wherein the policy command service runs in a fabric controller in the distributed computing system.

3. The method of claim 1, wherein the configuration file is generated based on inputs provided by a machine learning model.

4. The method of claim 1, wherein the threshold for when the parameters are to be sent from the node comprise trigger conditions for a sensor on the node.

5. The method of claim 4, wherein the trigger conditions comprise a rate of change of sensor outputs or a comparison with a predetermined value.

6. The method of claim 1, further comprising:
generating, by the policy command service, an updated configuration file defining updates to the parameters to be monitored at the selected node; and
sending the updated configuration file to the controller communicatively coupled to the selected node.

7. The method of claim 6, further comprising:
analyzing the stored parameters to predict a failure of the selected node.

8. The method of claim 7, further comprising:
in response to the predicted failure, initiating a maintenance action for the selected node.

9. A computing node comprising a baseboard management controller configured to perform operations comprising:
receiving, from a policy command service executing in a control plane of a distributed computing system, a configuration file defining parameters to be monitored at the computing node, a timing factor indicating when the parameters are to be monitored, and a threshold for when the parameters are to be sent from the computing node;
based on the configuration file, configuring, while the computing node is operational in the distributed computing system, the baseboard management controller to monitor the computing node in accordance with the configuration file, and further to copy content of the configuration file to a shared memory, and spawn worker threads to upload content of the configuration file from the shared memory and monitor the computing node according to the configuration file; and
sending, by the baseboard management controller to a storage at the distributed computing system, the parameters defined in the configuration file for analysis of maintenance and health of the computing node.

10. The computing node of claim 9, wherein the threshold for when the parameters are to be sent from the node comprise trigger conditions for a sensor on the node.

11. The computing node of claim 10, wherein the trigger conditions comprise a rate of change of sensor outputs or a comparison with a predetermined value.

12. The computing node of claim 10, the baseboard management controller further configured to perform operations comprising:
receiving, from the policy command service, an updated configuration file defining updates to the parameters to be monitored at the computing node; and
sending the updated configuration file to the controller communicatively coupled to the computing node.

13. The computing node of claim 9, the baseboard management controller configured to perform operations comprising:
receiving, from the policy command service, an updated configuration file defining updates to the parameters to be monitored at the computing node; and
configuring, while the computing node is operational in the distributed computing system, the baseboard management controller to monitor the computing node in accordance with the updated configuration file.

14. The computing node of claim 9, wherein the baseboard management controller is configured to communicate directly to the distributed computing system via a network interface.

15. The computing node of claim 9, wherein baseboard management controller is communicatively coupled to a plurality of sensors on the computing node, and the parameters are collected by the baseboard management controller from communicatively coupled sensors.

16. A baseboard management controller configured to perform operations comprising:
receiving, from a policy command service executing in a control plane of a distributed computing system, a configuration file defining parameters to be monitored at a computing node communicatively coupled to the baseboard management controller, a timing factor indicating when the parameters are to be monitored, and a threshold for when the parameters are to be sent from the computing node;
based on the configuration file, configuring, while the computing node is operational in the distributed computing system, the baseboard management controller to monitor the computing node in accordance with the configuration file, and further to copy content of the configuration file to a shared memory, and spawn worker threads to upload content of the configuration file from the shared memory and monitor the computing node according to the configuration file; and
sending, by the baseboard management controller to a storage at the distributed computing system, the parameters defined in the configuration file for analysis of maintenance and health of the computing node.

17. The baseboard management controller of claim 16, wherein the threshold for when the parameters are to be sent from the node comprise trigger conditions for a sensor on the node.

18. The baseboard management controller of claim 17, wherein the trigger conditions comprise a rate of change of sensor outputs or a comparison with a predetermined value.

19. The baseboard management controller of claim 18, wherein the operations further comprise:

receiving, from the policy command service, an updated configuration file defining updates to the parameters to be monitored; and configuring, while the baseboard management controller is operational, the baseboard management controller to monitor the computing node in accordance with the updated configuration file.

\* \* \* \* \*